US012717927B2

(12) United States Patent
Cosentino et al.

(10) Patent No.: US 12,717,927 B2
(45) Date of Patent: Aug. 25, 2026

(54) MITIGATING VULNERABILITIES IN A SOFTWARE PROGRAM BASED ON ITS USAGE

(71) Applicant: Red Hat, Inc., Raleigh, NC (US)

(72) Inventors: Andrea Cosentino, Rome (IT); Luca Burgazzoli, Piacenza (IT)

(73) Assignee: Red Hat, Inc., Raleigh, NC (US)

( * ) Notice: Subject to any disclaimer, the term of this patent is extended or adjusted under 35 U.S.C. 154(b) by 134 days.

(21) Appl. No.: 18/790,484

(22) Filed: Jul. 31, 2024

(65) Prior Publication Data

US 2026/0037636 A1 Feb. 5, 2026

(51) Int. Cl.
*G06F 21/57* (2013.01)
*G06F 8/65* (2018.01)

(52) U.S. Cl.
CPC .............. *G06F 21/577* (2013.01); *G06F 8/65* (2013.01)

(58) Field of Classification Search
CPC ................................ G06F 21/577; G06F 8/65
See application file for complete search history.

(56) References Cited

U.S. PATENT DOCUMENTS

| | | | | |
|---|---|---|---|---|
| 10,228,924 | B2 * | 3/2019 | Berger | H04L 63/107 |
| 2024/0152625 | A1 * | 5/2024 | Bar | G06Q 10/0875 |
| 2024/0211608 | A1 * | 6/2024 | Rogers | G06F 21/577 |
| 2024/0338184 | A1 * | 10/2024 | Bendert | G06F 8/433 |
| 2025/0265346 | A1 * | 8/2025 | Hulick | G06F 21/577 |

* cited by examiner

*Primary Examiner* — Sm A Rahman
(74) *Attorney, Agent, or Firm* — Kilpatrick Townsend & Stockton LLP

(57) ABSTRACT

In one example, a system can execute a first version of a software program during a time window. While executing the first version of the software program during the time window, the system can generate a software bill of materials (SBOM) for the software program. The SBOM can identify a dependency relied upon by the first version of the software program during the time window. The system can determine that the dependency has a vulnerability based on a Common Vulnerabilities and Exposures (CVE) record associated with the dependency. The system can then obtain an updated version of the dependency that lacks the vulnerability, generate a second version of the software program using the updated version of the dependency to mitigate the vulnerability, and deploy the second version of the software program. The system may also shut down the first version of the software program.

20 Claims, 5 Drawing Sheets

400

MITIGATING VULNERABILITIES IN A SOFTWARE PROGRAM BASED ON ITS USAGE

TECHNICAL FIELD

The present disclosure relates generally to cybersecurity. More specifically, but not by way of limitation, this disclosure relates to mitigating vulnerabilities in a software program based on which aspects of the software program are actually used in a given computing environment.

BACKGROUND

With the rapid proliferation of Internet connected devices, cybersecurity is an ever-growing concern. Hackers and other malicious actors may attempt to exploit defects in software to steal sensitive information, disrupt services, take over devices, and wreak other havoc. To help combat these issues, many software developers release updates for their software when a defect (e.g., vulnerability) is discovered. For example, software developers may release a patch, or an entirely new version of the software, to help prevent intentional or unintentional invocation of the defect.

DETAILED DESCRIPTION

Figure 1:
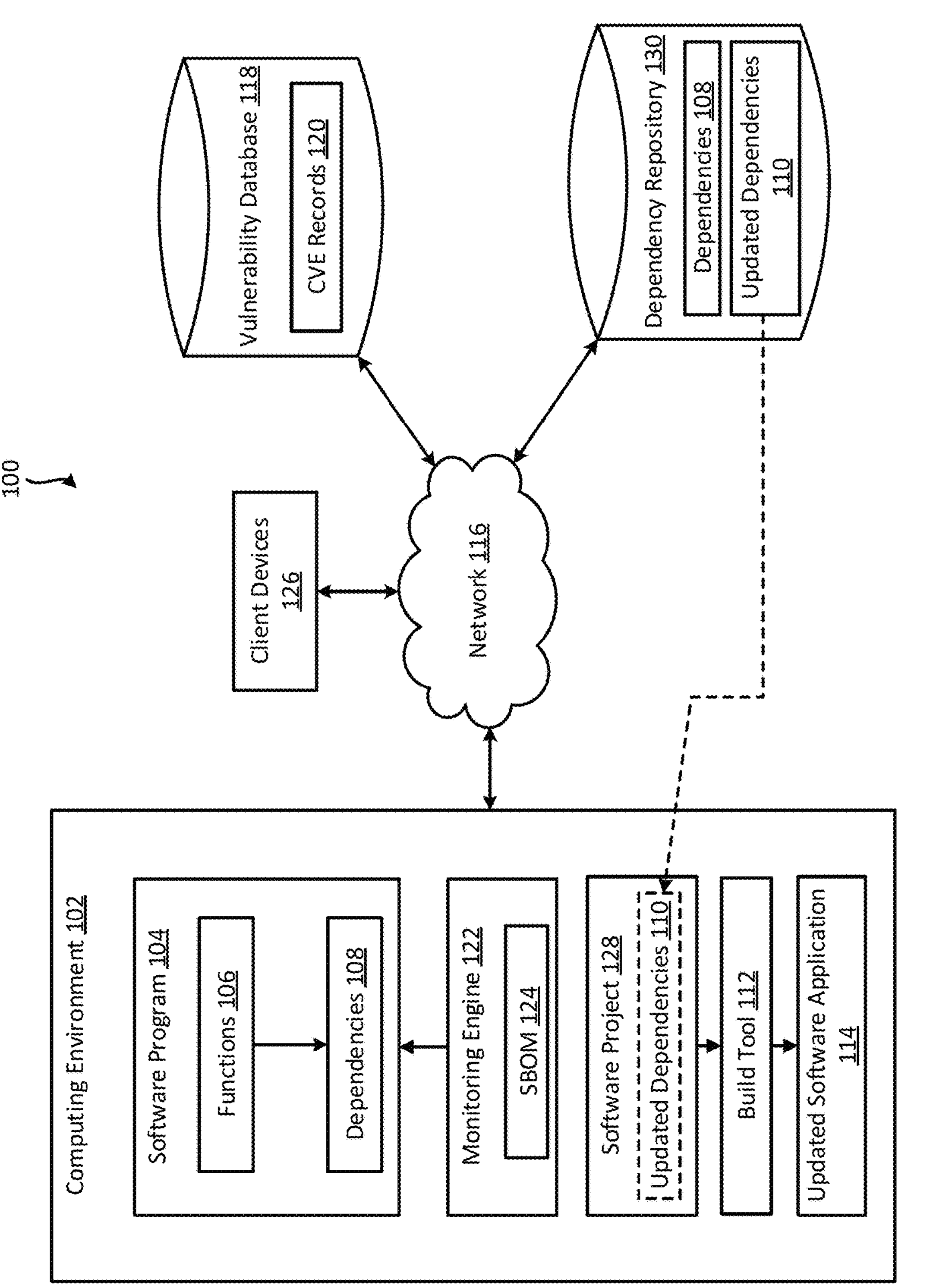
FIG. 1 shows a block diagram of an example of a system for mitigating vulnerabilities in a software program based on its usage according to some aspects of the present disclosure.

Software developers may release updates to their software programs to correct defects such as vulnerabilities. These updates may be patches or entire version upgrades. When such updates are released, end users often blindly apply the update, without giving much thought to whether the defective portion of the software program is actually problematic for their computing environment. For instance, there are often scenarios in which the defective portion of the software program is never used by the end user and, thus, would not actually be problematic if left alone in the user's computing environment. Nonetheless, many such users apply updates indiscriminately and even automatically, which can waste time and computing resources (e.g., memory, processing power, bandwidth) in downloading and installing unnecessary updates that may have no practical effect in their computing environment. This type of overinclusive updating can have significant performance impacts in complex computing environments, such as cloud computing environments, where hundreds or thousands of software programs may be subject to updates over time.

Some examples of the present disclosure can overcome one or more of the abovementioned problems by automatically updating a software program in a computing environment based on the functionality of the software program actually used in the computing environment. For example, a computing environment can deploy a software program and monitor its usage during a time window. As the software program executes, it may invoke one or more functions that may rely upon one or more dependencies. Examples of such dependencies include libraries, packages, etc. By monitoring the software program, the computing environment can identify the dependencies that are actually used during the time window. The computing environment can then evaluate the dependencies against a vulnerability database to identify any vulnerable dependencies. If a vulnerable dependency is identified, the computing environment can automatically obtain an updated version of the dependency that excludes the vulnerability, rebuild the software program using the updated version of the dependency, and deploy the updated version of the software program in the computing environment. The computing environment can also shut down the older (e.g., outdated) version of the software program. In this way, the computing environment can resolve vulnerabilities in dependencies that it knows are actually used by the software program, while minimizing downtime related to the update. The downtime can be minimized since the prior version of the software program may only be shut down after the updated version is deployed.

The above process can be iterated over multiple time windows, so that the dependencies of the software program are updated over time in a strategic and targeted way, depending on which functionality is actually invoked by the software program during those time windows. This can prevent unnecessary updates from being applied to the software program, while also helping to ensure that vulnerable portions of the software program are identified and fixed.

In some examples, the computing environment can determine which dependencies are relied upon by the software program during a time window by generating a software bill of materials (SBOM). An SBOM can include an inventory of the software components (e.g., open source and third-party components) present in a codebase. The SBOM may also list the licenses that govern those components, the versions of those components used in the codebase, their patch status, and other information. The SBOM may be generated in real time as the software program is executing and include a list of dependencies relied upon by the software program during the time window. The computing environment can then compare the list of dependencies against the vulnerability database to identify any vulnerable dependencies.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for mitigating vulnerabilities in a software program 104 based on its usage according to some aspects of the present disclosure. Examples of the software program 104 may include an application, a microservice, a serverless function, etc. The software program 104 can be deployed in a computing environment 102. In some examples, the computing environment 102 may be a distributed computing environment, such as a cloud computing environment, a computing cluster, or a data grid. Such distributed computing environments may include multiple networked nodes (e.g., physical or virtual machines) that cooperate with one another to perform various tasks.

As the software program 104 executes in the computing environment 102 over a time window, it may invoke one or more functions 106 (e.g., Java, Python, or C++ functions). The functions 106 may be invoked by the software program 104 in response to receiving requests from client devices 126, which may be internal or external to the computing environment 102. The functions 106 may depend on one or more dependencies 108 for their execution. Examples of such dependencies 108 can include packages, libraries, etc. The dependencies 108 may be developed by the same entity that developed the software program 104 and/or by other parties. For instance, one or more of the dependencies 108 may be created and maintained by other developers, who may post their projects for the public to download on GitHub® or other websites. To save time, a software developer may download those dependencies 108 and incorporate them into the software project 128 to perform the functions 106, rather than directly programming the dependencies 108. The dependencies 108 may be downloaded from a dependency repository 130, which can include any number of websites, repositories, and/or other sources of dependencies.

In some examples, the computing environment 102 can execute a monitoring engine 122 to determine the dependencies 108 invoked by the software program 104 over the time window. To determine which dependencies 108 were invoked, the monitoring engine 122 may implement one or more techniques. For example, the monitoring engine 122 may execute a SBOM generation tool to generate an SBOM 124. While some SBOM generation tools may be executed at any point in time against a fixed codebase to develop a comprehensive list of all dependencies relied upon in the entire codebase, other SBOM generation tools may be executed in a more targeted manner. For instance, some SBOM generation tools can be executed while the software program is running to develop a more limited list of dependencies relied upon (e.g., invoked by) by the software program during a particular time window. One example of this kind of SBOM generation tool is jbom by Contrast Security®. Using such a tool, the monitoring engine 122 can generate an SBOM 124 that includes a list of dependencies 108 that were actually relied upon by the software program 104 during that time window. Such a list of dependencies 108 would exclude any other dependencies not relied upon by the software program 104 during that time window.

Other approaches may additionally or alternatively be used to determine which dependencies 108 were invoked by the software program 104 during the time window. For example, the monitoring engine 122 may implement a tracing operation. Tracing can involve capturing and recording information about the execution of a software program 104. Such information can be saved to a tracing log. For instance, the tracing log can store event data that indicates which functions 106 were invoked during the time window. To perform the tracing operation, the monitoring engine 122 can include a tracing tool. Examples of such a tracing tool can include OpenTelemetry by Cloud Native Computing Foundation®, Dapper by Google®, and Canopy by Meta®. Based on the invoked functions 106 identified from the tracing log, the monitoring engine 122 can determine the dependencies 108 corresponding to those functions 106.

After determining which dependencies 108 were invoked by the software program 104 over the time window, the computing environment 102 can evaluate the dependencies 108 against a vulnerability database 118 to determine which, if any, of the dependencies 108 have a vulnerability. The vulnerability database 118 may be a Common Vulnerabilities and Exposures (CVE) database and can include CVE records 120. Each CVE record 120 may specify a version of a dependency that has a vulnerability, details about the vulnerability, and a version of the dependency in which the vulnerability is fixed (if one exists). Such vulnerabilities may be identified by the end users, security experts, or other members of the public and reported to the vulnerability database 118.

To determine which dependencies 108 have a vulnerability, the computing environment 102 can transmit queries to the vulnerability database 118 via one or more networks 116, such as the Internet. Based on the queries, the vulnerability database 118 can determine if there are any CVE records 120 that match the version of a dependency used in the software program 104. If so, the vulnerability database 118 may transmit a copy of the CVE record to the computing environment 102.

If the computing environment 102 determines that any of the dependencies 108 in the software program 104 have vulnerabilities, the computing environment 102 can identify updated versions of those dependencies 110 in which the vulnerabilities are resolved. For example, the computing environment 102 may determine that the software program 104 relied upon a particular version (e.g., v1.2) of a dependency during the time window. The computing environment 102 can also determine that this version of the dependency has a vulnerability, for example by communicating with the vulnerability database 118. The computing environment 102 can then identify a version of the dependency in which the vulnerability is fixed (e.g., v1.3), for example by extracting such information from the corresponding CVE record in the vulnerability database 118.

After identifying updated versions of the dependencies 110 in which the vulnerabilities are resolved, the computing environment 102 can obtain copies of them. For example, the computing environment 102 can download copies of the updated versions of the dependencies from the dependency repository 130. The computing environment 102 can then replace the existing versions of the dependencies 108 with the updated versions of the dependencies 110. For example, the computing environment 102 can replace the existing versions of the dependencies 108 with the updated versions of the dependencies 110 in a software project 128 associated with the software program 104. In some examples, the software project 128 may include the source code for the software program 104, the dependencies relied upon by the source code, configuration data, and/or other information for building the software program 104.

The computing environment 102 can next execute a build process for rebuilding the software program using the updated versions of the dependencies 110. For example, the computing environment 102 can execute a build tool 112 on the software project 128 to rebuild the software program. An example of the build tool 112 may be a compiler. The build process may involve compiling the source code for the software program and/or performing other steps to construct an updated version of the software application 114 that excludes the vulnerabilities.

After generating the updated version of the software application 114, the computing environment 102 can then deploy the updated version of the software application 114.

The prior version of the software program 104 may then be shut down to conserve computing resources and prevent exploitation of the vulnerabilities.

Through the above process, the computing environment 102 can identify and correct vulnerabilities associated with dependencies that are invoked by the software application in the computing environment 102. This process can avoid applying updates that may not be relevant to how the software application is actually used in the computing environment 102, by limiting updates to only those dependencies actually invoked during the time window. Limiting the updates in this way can conserve valuable computing resources, such as memory and processing power. This process can also be performed with very little, if any, downtime of the software application.

The above process can be repeated periodically, such as every 10 minutes, every day, or every week. During each repetition, the computing environment 102 can update one or more vulnerable dependencies relied upon by the software application during the corresponding time window. Vulnerable dependencies that are more frequently used by the software application in the computing environment 102 will likely be corrected earlier in the iterative process, while vulnerable dependencies that are less frequently used by the software application in the computing environment 102 will likely be corrected later in the iterative process. In this way, the software application can be sequentially updated over time to eventually converge to a point where most, if not all, of the vulnerable dependencies that are actually invoked by the software program in the computing environment 102 are resolved.

The above process can provide a custom-tailored updating scheme that depends on how the software is actually used in a given computing environment. Since the same software application may be used in different ways in different computing environments, this process may result in a different sequence of updates being applied to the same software program in different computing environments. As a result, two different computing environments may update the same software program in different ways. For instance, a first computing environment may update a software program with a first set of updates and not a second set of updates, and a second computing environment may update the same software program with the second set of updates and not the first set of updates. This is in contrast to conventional updating approaches, in which a one-size-fits-all update is rolled out to all end users at the same time.

Figure 2:
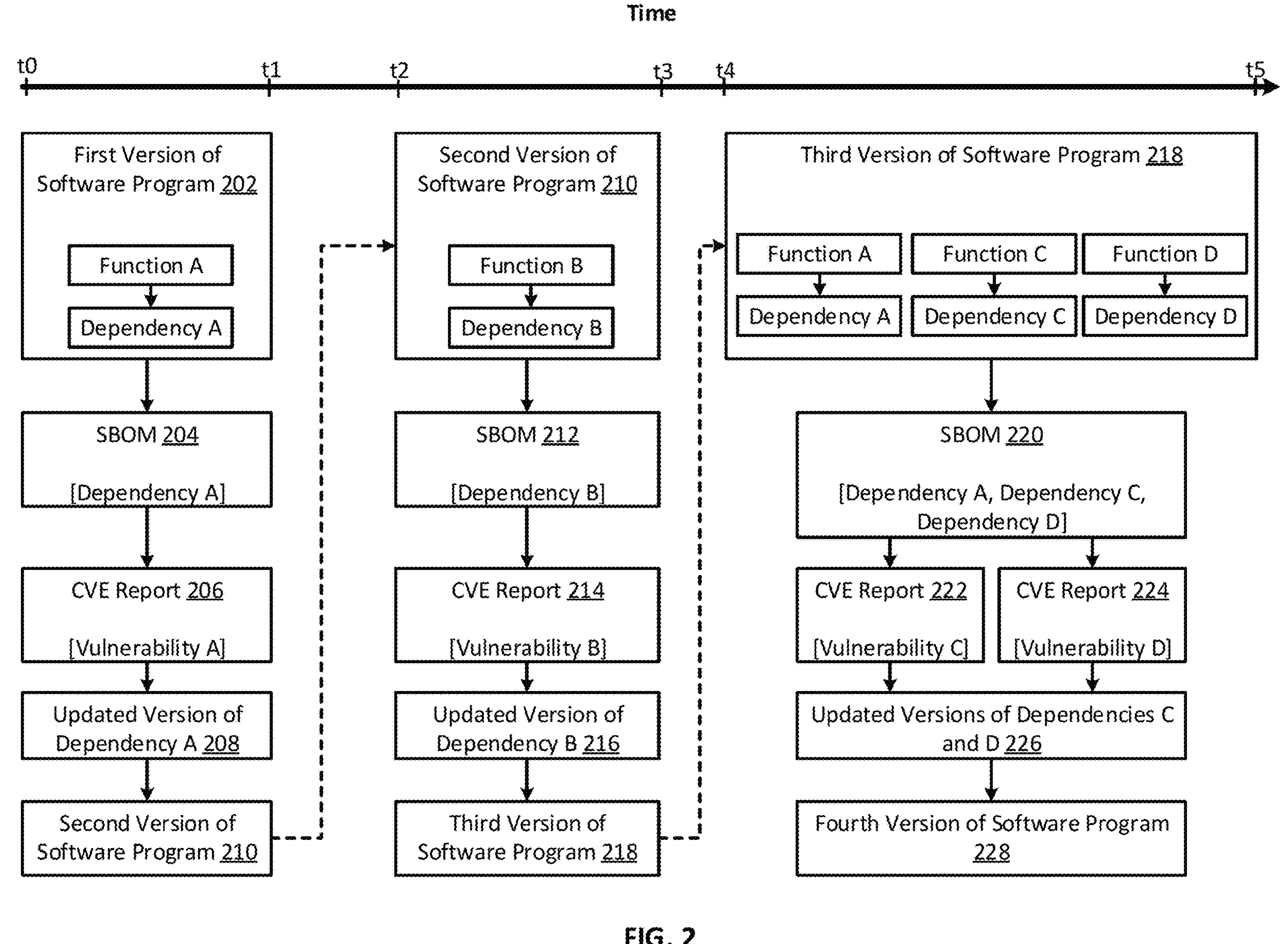
FIG. 2 shows an example of a series of updates being applied to a software program over a series of time windows according to some aspects of the present disclosure.

Turning now to FIG. 2, shown is an example of a series of updates being applied to a software program over a series of time windows according to some aspects of the present disclosure. The process can begin with a first version of a software program 202 being executed during a first time window that extends from time t0 to time t1. During that time window, the first version of the software program 202 may execute Function A which depends on Dependency A. The computing environment can monitor the first version of the software program 202 during the first time window to determine that Dependency A was relied upon by the first version of the software program 202 during the first time window. For example, the computing environment can generate an SBOM 204 during the first time window, where the SBOM 204 indicates that Dependency A was relied upon by the first version of the software program 202 during the first time window. The computing environment can next access a first CVE report 206 associated with Dependency A. The first CVE report 206 may describe a vulnerability in the version of Dependency A that was used during the first time window. Based on the first CVE report 206, the computing environment can determine an updated version of Dependency A 208 that fixes the vulnerability. The computing environment can then generate and deploy a second version of the software program 210 based on the updated version of Dependency A 208. The computing environment may also shut down the first version of the software program 202.

The second version of the software program 210 can be executed during a second time window that extends from time t2 to time t3. During that time window, the second version of the software program 210 may execute Function B which depends on Dependency B. The computing environment can monitor second version of the software program 210 during the second time window to determine that Dependency B was relied upon by the second version of the software program 210 during the second time window. For example, the computing environment can generate an SBOM 212 during the second time window, where the SBOM 212 indicates that Dependency B was relied upon by the second version of the software program 210 during the second time window. The computing environment can next access a second CVE report 214 associated with Dependency B. The second CVE report 214 may describe a vulnerability in the version of Dependency B that was used during the second time window. Based on the second CVE report 214, the computing environment can determine an updated version of Dependency B 216 that fixes the vulnerability. The computing environment can then generate and deploy a third version of the software program 218 based on the updated version of Dependency B 216. The computing environment may also shut down the second version of the software program 210.

The third version of the software program 218 can be executed during a third time window that extends from time t4 to time t5. During that time window, the third version of the software program 218 may execute Functions A, C, and D, which depend on Dependencies A, C, and D, respectively. The computing environment can monitor the third version of the software program 218 during the third time window to determine that Dependencies A, C, and D were relied upon by the third version of the software program 218 during the third time window. For example, the computing environment can generate an SBOM 220 during the third time window, where the SBOM 220 indicates that Dependencies A, C, and D were relied upon by the third version of the software program 218 during the third time window. The computing environment can then access CVE reports 222-224 associated with Dependencies C and D, respectively. The CVE reports 222-224 may describe vulnerabilities in the versions of Dependencies C and D that were used during the third time window. Since Dependency A was already previously updated to a version that lacks any known vulnerabilities, there may be no need to further update Dependency A. Based on the CVE reports 222-224, the computing environment can determine updated versions of Dependencies C and D 226 that fix their vulnerabilities. The computing environment can then generate and deploy a fourth version of the software program 228 based on the updated versions of Dependencies C and D 226. The computing environment may also shut down the third version of the software program 218.

The above process can continue to repeat over time so that dependencies are sequentially updated as they are invoked by the software program, as opposed to simply updating all of the dependencies of the software program at once (including dependencies that may never be invoked in the computing environment).

Figure 3:
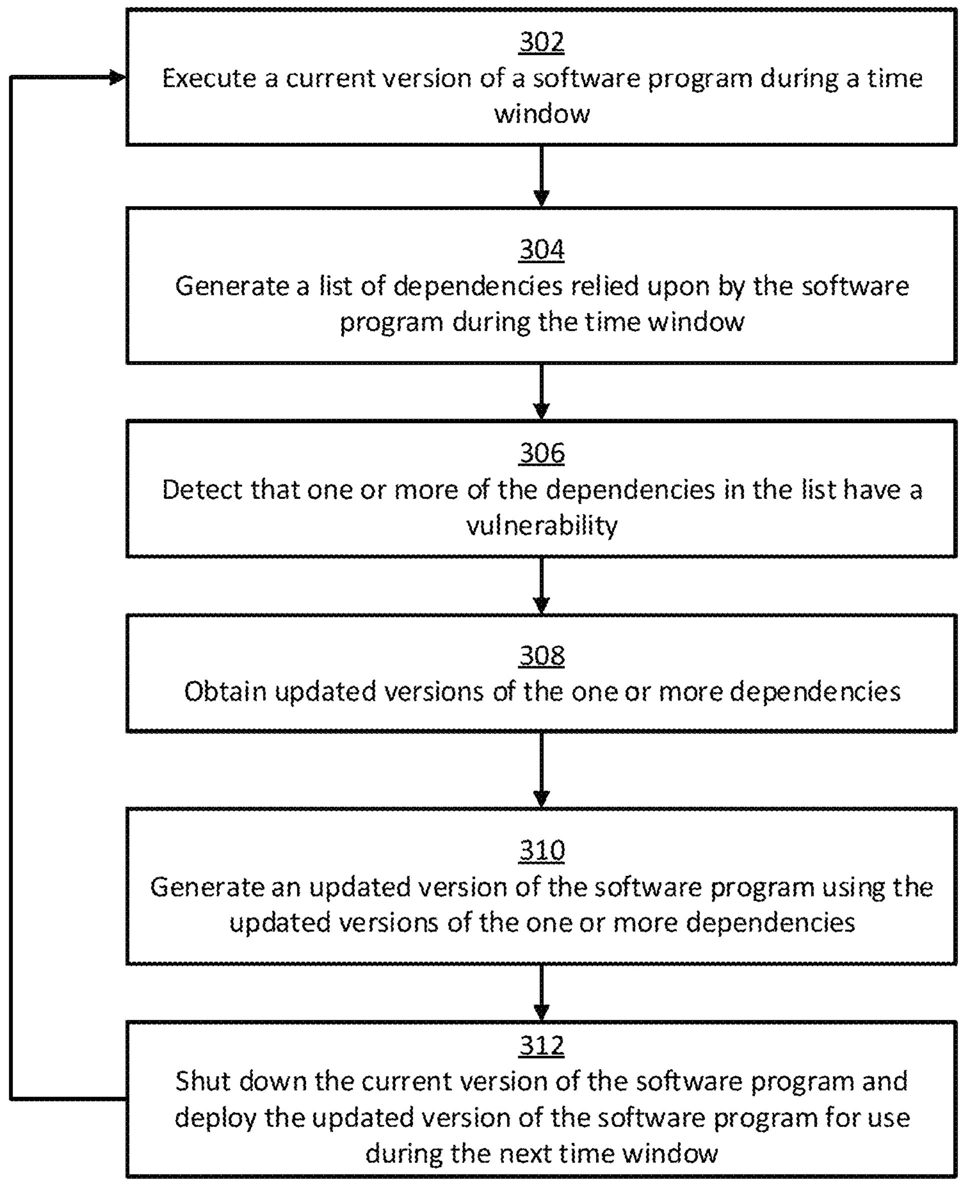
FIG. 3 shows a flowchart of an example of a process for mitigating vulnerabilities in a software program based on its usage according to some aspects of the present disclosure.

FIG. 3 shows a flowchart of an example of a process for mitigating vulnerabilities in a software program based on its usage according to some aspects of the present disclosure. Other examples may include more steps, fewer steps, different steps, or a different sequence of steps than is shown in FIG. 3. The steps of FIG. 3 are described below with reference to the components of FIG. 1 described above.

In block 302, a computing environment 102 executes a current version of a software program (e.g., software program 104) during a time window. The time window may be of any suitable length, such as five minutes, a day, or a week.

In block 304, the computing environment 102 generates a list of dependencies (e.g., dependencies 108) relied upon by the software program during the time window. The dependencies may be libraries, packages, and/or other software components, which may be developed by third parties and integrated into the software program during a build process. The list may include the name and version number of each dependency.

In some examples, the computing environment 102 can generate an SBOM (e.g., SBOM 124) while the current version of the software program is running. The SBOM can include the list of dependencies. Additionally, or alternatively, other approaches such as tracing may be used to generate the list.

In block 306, the computing environment 102 detects that one or more of the dependencies in the list have a vulnerability. For example, the computing environment 102 can query a vulnerability database 118 to determine whether any of the dependencies on the list have a vulnerability.

In block 308, the computing environment 102 obtains updated versions of the one or more dependencies. For example, the computing environment 102 can download the updated versions of the dependencies (e.g., updated dependencies 110) from a dependency repository 130.

In block 310, the computing environment 102 generates an updated version of the software program (e.g., updated software program 114) using the updated versions of the dependencies. For example, the computing environment 102 can execute a build tool 112 on a software project 128 associated with the software program, to thereby rebuild the software application using the updated versions of the dependencies. The software project 128 may include the source code for the software program and/or the updated versions of the dependencies.

In block 312, the computing environment 102 shuts down the current version of the software program and deploys the updated version of the software program for use during the next time window. The current version of the software program may be shut down before or after the updated version is deployed. In some examples, the current version may be shut down before the updated version is deployed if minimizing vulnerabilities is more important than introducing downtime. In other examples, the current version may be shut down after the updated version is deployed if minimizing downtime is more important than the vulnerabilities. After the updated version of the software program is deployed, the process can return to block 302 and repeat for the next time window.

The above process may be repeated perpetually or until a condition is satisfied. One example of such a condition may be that a threshold number of vulnerable dependencies have been updated. For example, the condition may be that 90% of all dependencies of the software program have been updated to exclude all known vulnerabilities.

It will be appreciated that, in some cases, the same dependency may be updated multiple times over multiple iterations. For instance, a dependency may be updated from v1.0 to v1.1 during a time window to resolve a vulnerability in v1.0. Thereafter, a vulnerability in v1.1 may be discovered. This may cause the same dependency to be updated to v1.2 during a later time window to resolve the vulnerability in v1.1. Thereafter, a vulnerability in v1.2 may be discovered. This may cause the same dependency to be updated to v1.3 during a later time window to resolve the vulnerability in v1.2. And so on.

Figure 4B:
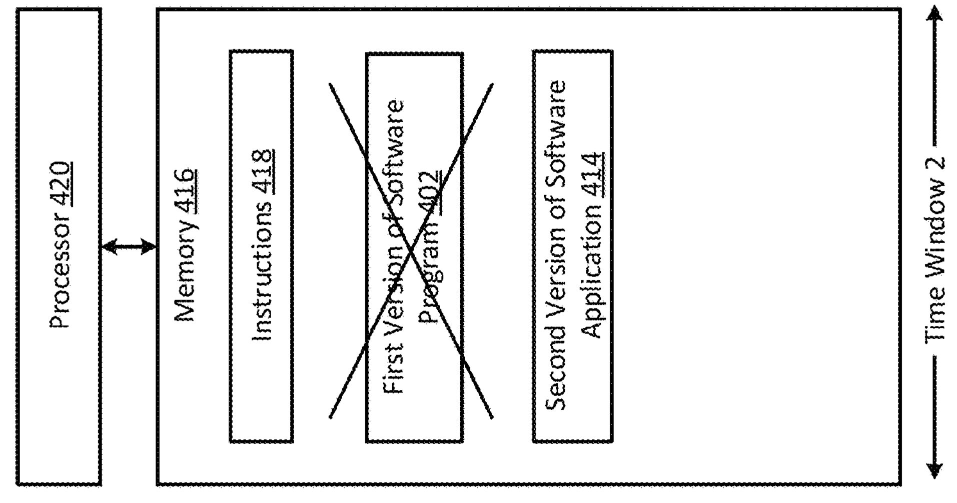
FIGS. 4A-B show block diagrams of an example of a system for mitigating vulnerabilities in a software program based on its usage according to some aspects of the present disclosure.
Figure 4A:
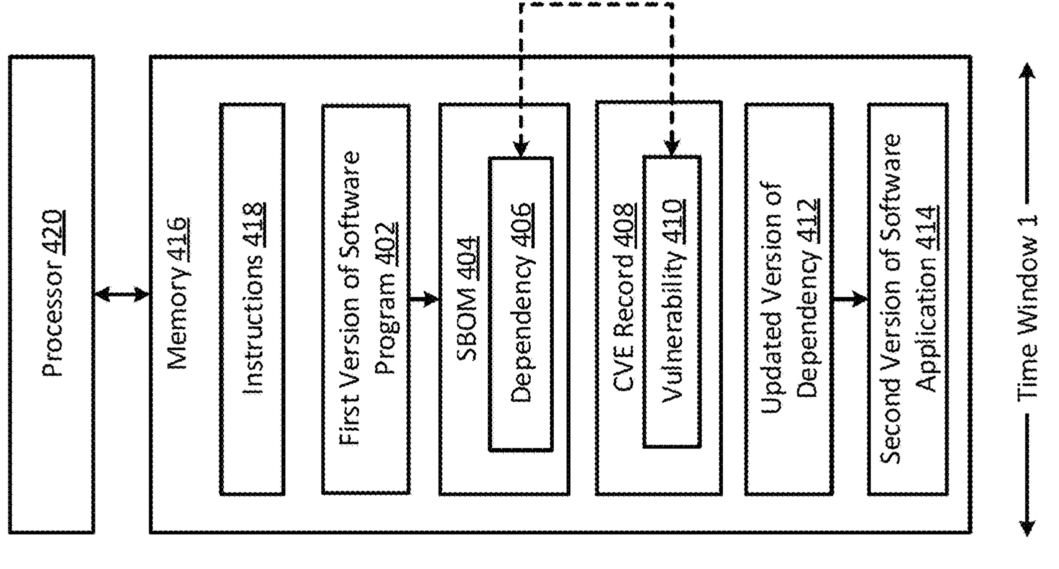

Turning now to FIGS. 4A-B, shown are block diagrams of an example of a system 400 for mitigating vulnerabilities in a software program based on its usage according to some aspects of the present disclosure. FIG. 4A shows the system 400 during a first time window, and FIG. 4B shows the system during a second time window, which is subsequent to the first time window.

As shown, the system 400 can include a processor 420 communicatively coupled to a memory 416 by a bus. The processor 420 can include one processing device or multiple processing devices. Non-limiting examples of the processor 420 include a Field-Programmable Gate Array (FPGA), an application-specific integrated circuit (ASIC), a microprocessor, or any combination of these. The processor 420 can execute instructions 418 stored in the memory 416 to perform operations, such as any of the operations described herein with respect to the computing environment 102. In some examples, the instructions 418 can include processor-specific instructions generated by a compiler or an interpreter from code written in any suitable computer-programming language, such as C, C++, C#, Python, or Java.

The memory 416 can include one memory device or multiple memory devices. The memory 416 can be volatile or non-volatile, such that the memory 416 retains stored information when powered off. Non-limiting examples of the memory 416 include electrically erasable and programmable read-only memory (EEPROM), flash memory, or any other type of non-volatile memory. At least some of the memory device can include a non-transitory computer-readable medium from which the processor 420 can read the instructions 418. A computer-readable medium can include electronic, optical, magnetic, or other storage devices capable of providing the processor 420 with computer-readable instructions or other program code. Non-limiting examples of a computer-readable medium can include magnetic disks, memory chips, ROM, random-access memory (RAM), an ASIC, a configured processor, optical storage, or any other medium from which a computer processor can read the instructions 418.

In some examples, the processor 420 can execute the instructions 418 to perform operations. For example, the processor 420 can execute a first version of a software program 402 during a time window, such as Time Window 1 shown in FIG. 4A. While executing the first version of the software program 402 during the time window, the processor 420 can generate a software bill of materials (SBOM) 404 for the software program. The SBOM 404 can identify a dependency 406 relied upon by the first version of the software program 402 during the time window. The processor 420 can then determine that the dependency 406 has a vulnerability 410 based on a CVE record 408 associated with the dependency 406. The processor 420 can replace the dependency 406 with an updated version of the dependency 412 that lacks the vulnerability 410. The processor 420 may identify the updated version of the dependency 412 based on the CVE record 408. The processor 420 can then generate a second version of the software program 414 (e.g., by rebuilding the software program) using the updated version of the dependency 412 to mitigate the vulnerability 410. The processor 420 can deploy the second version of the software program 414 and shut down the first version of the software program 402, as shown in FIG. 4B. As a result, during a subsequent time window (e.g., Time Window 2), the second version of the software program 414 may be executed rather than the first version of the software program 402.

Figure 5:
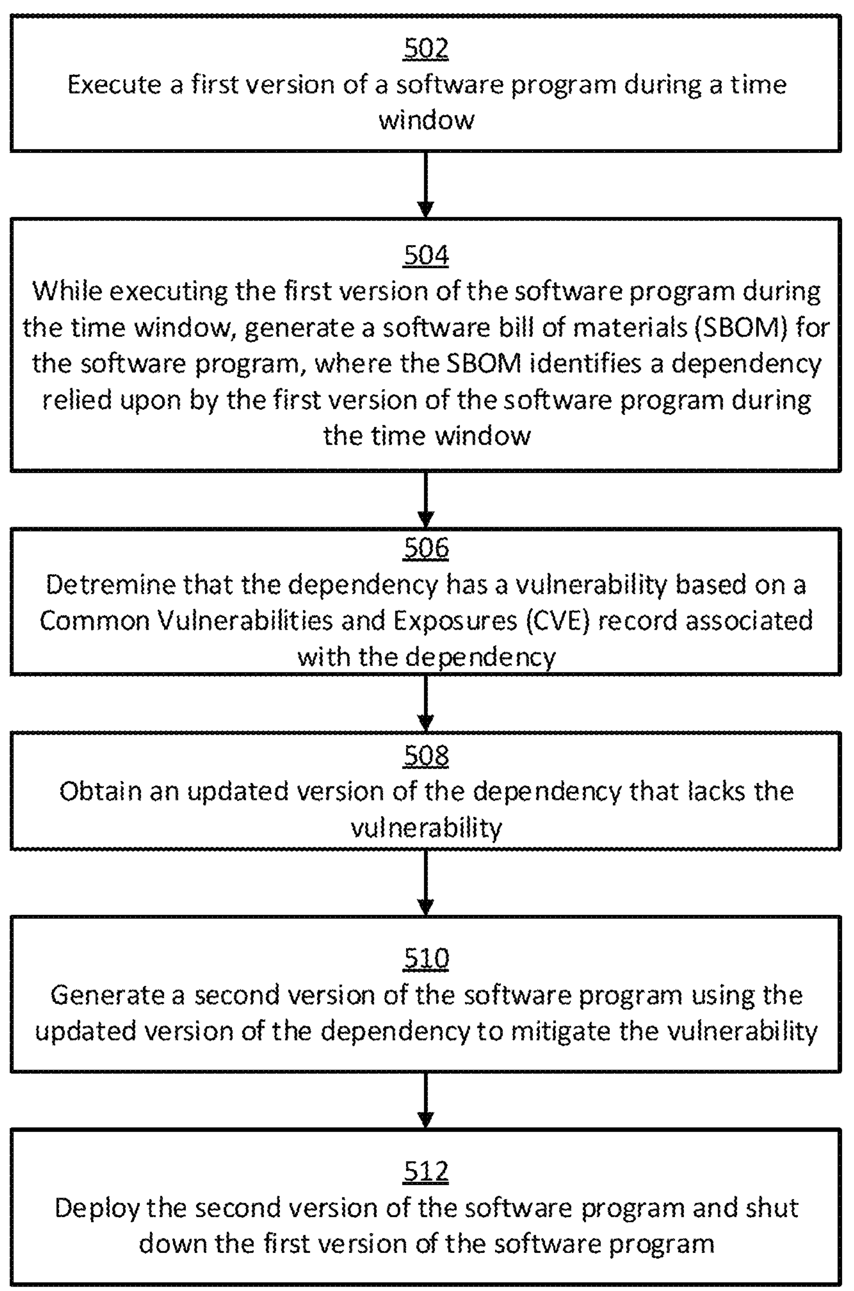
FIG. 5 shows a flowchart of an example of a process for mitigating vulnerabilities in a software program based on its usage according to some aspects of the present disclosure.

Turning now to FIG. 5, shown is a flowchart of an example of a process for mitigating vulnerabilities in a software program based on its usage according to some aspects of the present disclosure. Other examples may include more steps, fewer steps, different steps, or a different sequence of steps than is shown in FIG. 5. The steps of FIG. 5 are described below with reference to the components of FIG. 4 described above.

In block 502, the processor 420 executes a first version of a software program 402 during a time window, such as Time Window 1 shown in FIG. 4A.

In block 504, while executing the first version of the software program 402 during the time window, the processor 420 generates a software bill of materials (SBOM) 404 for the software program. The SBOM 404 can specify a dependency 406 relied upon by the first version of the software program 402 during the time window.

In block 506, the processor 420 determines that the dependency 406 has a vulnerability 410 based on a CVE record 408 associated with the dependency 406.

In block 508, the processor 420 obtains an updated version of the dependency 412, for example by downloading it from a dependency repository 130. The processor 420 may analyze the CVE record 408 to determine the updated version of the dependency 412. In some examples, the processor 420 may then replace the dependency 406 with an updated version of the dependency 412.

In block 510, the processor 420 generates a second version of the software program 414 using the updated version of the dependency 412 to mitigate the vulnerability 410. This may involve rebuilding the software program using a built tool, such as build tool 112 of FIG. 1.

In block 510, the processor 420 deploys the second version of the software program 414 and shuts down the first version of the software program 402, as shown in FIG. 4B.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
- one or more processors; and
- one or more memories including instructions that are executable by the one or more processors for causing the one or more processors to perform operations including:
  - executing a first version of a software program during a time window;
  - while executing the first version of the software program during the time window, generating a software bill of materials (SBOM) for the software program, wherein the SBOM identifies a dependency relied upon by the first version of the software program during the time window;
  - based on the SBOM identifying the dependency, determining whether the dependency identified in the SBOM has a vulnerability; and
  - in response to determining that the dependency identified in the SBOM has a vulnerability based on a Common Vulnerabilities and Exposures (CVE) record associated with the dependency, automatically:
    - obtaining an updated version of the dependency that lacks the vulnerability;
    - generating a second version of the software program using the updated version of the dependency to mitigate the vulnerability; and
    - deploying the second version of the software program and shutting down the first version of the software program.

2. The system of claim 1, wherein the time window is a first time window, the SBOM is a first SBOM, the dependency is a first dependency, the vulnerability is a first vulnerability, the CVE record is a first CVE record, and the operations further comprise:
- executing the second version of the software program during a second time window that is subsequent to the first time window;
- while executing the second version of the software program during the second time window, generating a second SBOM for the software program during the second time window, wherein the second SBOM identifies a second dependency relied upon by the second version of the software program during the second time window;
- based on the second SBOM identifying the second dependency, determining whether the second dependency has a second vulnerability;
- in response to determining that the second dependency has a second vulnerability based on a second CVE record associated with the second dependency, the second CVE record being different from the first CVE record, automatically:
  - obtaining an updated version of the second dependency that lacks the second vulnerability;
  - generating a third version of the software program using the updated version of the second dependency to mitigate the second vulnerability; and
  - deploying the third version of the software program and shutting down the second version of the software program.

3. The system of claim 2, wherein the second SBOM excludes the first dependency.

4. The system of claim 1, wherein the operations comprise:
- iteratively and sequentially mitigating vulnerabilities in the software program over a series of time windows by, for each respective time window in the series of time windows:
  - executing the software program;
  - generating a respective SBOM for the software program while the software program is executing, wherein the respective SBOM includes a respective dependency relied upon by the software program during the respective time window, the respective dependency being different from other dependencies relied upon by the software program during previous time windows in the series of time windows;
  - based on the respective SBOM identifying the respective dependency, determining whether the respective dependency has a respective vulnerability; and in response to determining that the respective dependency has a respective vulnerability, automatically:

obtaining an updated version of the respective dependency that lacks the respective vulnerability; and mitigating the respective vulnerability by rebuilding the software program using the updated version of the respective dependency.

5. The system of claim 1, wherein the SBOM lists a plurality of dependencies relied upon by the software program during the time window, the plurality of dependencies including the dependency with the vulnerability.

6. The system of claim 5, wherein the operations further comprise, during the time window and prior to deploying the second version of the software program:

determining that at least two dependencies of the plurality of dependencies have vulnerabilities based on CVE records associated with the at least two dependencies; and in response to determining that the at least two dependencies have the vulnerabilities, automatically:

obtaining updated versions of the at least two dependencies that lack the vulnerabilities; and generating the second version of the software program using the updated versions of the at least two dependencies to mitigate the vulnerabilities.

7. The system of claim 1, wherein the operations comprise determining the updated version of the dependency from the CVE record.

8. A computer-implemented method comprising:

executing a first version of a software program during a time window;

while executing the first version of the software program during the time window, generating a software bill of materials (SBOM) for the software program, wherein the SBOM identifies a dependency relied upon by the first version of the software program during the time window;

based on the SBOM identifying the dependency, determining whether the dependency identified in the SBOM has a vulnerability; and in response to determining that the dependency identified in the SBOM has a vulnerability based on a Common Vulnerabilities and Exposures (CVE) record associated with the dependency, automatically:

obtaining an updated version of the dependency that lacks the vulnerability;

generating a second version of the software program using the updated version of the dependency to mitigate the vulnerability; and deploying the second version of the software program and shutting down the first version of the software program.

9. The method of claim 8, wherein the time window is a first time window, the SBOM is a first SBOM, the dependency is a first dependency, the vulnerability is a first vulnerability, the CVE record is a first CVE record, and further comprising:

executing the second version of the software program during a second time window that is subsequent to the first time window;

while executing the second version of the software program during the second time window, generating a second SBOM for the software program during the second time window, wherein the second SBOM identifies a second dependency relied upon by the second version of the software program during the second time window;

based on the second SBOM identifying the second dependency, determining whether the second dependency has a second vulnerability;

in response to determining that the second dependency has a second vulnerability based on a second CVE record associated with the second dependency, the second CVE record being different from the first CVE record, automatically:

obtaining an updated version of the second dependency that lacks the second vulnerability;

generating a third version of the software program using the updated version of the second dependency to mitigate the second vulnerability; and deploying the third version of the software program and shutting down the second version of the software program.

10. The method of claim 9, wherein the second SBOM excludes the first dependency.

11. The method of claim 8, further comprising:

iteratively and sequentially mitigating vulnerabilities in the software program over a series of time windows by, for each respective time window in the series of time windows:

executing the software program;

generating a respective SBOM for the software program while the software program is executing, wherein the respective SBOM includes a respective dependency relied upon by the software program during the respective time window, the respective dependency being different from other dependencies relied upon by the software program during previous time windows in the series of time windows;

based on the respective SBOM identifying the respective dependency, determining whether the respective dependency has a respective vulnerability; and in response to determining that the respective dependency has a respective vulnerability, automatically:

obtaining an updated version of the respective dependency that lacks the respective vulnerability; and mitigating the respective vulnerability by rebuilding the software program using the updated version of the respective dependency.

12. The method of claim 8, wherein the SBOM lists a plurality of dependencies relied upon by the software program during the time window, the plurality of dependencies including the dependency with the vulnerability.

13. The method of claim 12, further comprising, during the time window and prior to deploying the second version of the software program:

determining that at least two dependencies of the plurality of dependencies have vulnerabilities based on CVE records associated with the at least two dependencies; and in response to determining that the at least two dependencies have the vulnerabilities, automatically:

obtaining updated versions of the at least two dependencies that lack the vulnerabilities; and generating the second version of the software program using the updated versions of the at least two dependencies to mitigate the vulnerabilities.

14. The method of claim 8, wherein further comprising determining the updated version of the dependency from the CVE record.

15. A non-transitory computer-readable medium comprising program code that is executable by one or more processors for causing the one or more processors to perform operations including:

executing a first version of a software program during a time window;

determining that a dependency was relied upon by the first version of the software program during the time window;

based on determining that the dependency was relied upon by the first version of the software program during the time window, determining whether the dependency has a vulnerability;

in response to determining that the dependency has a vulnerability, automatically:

obtaining an updated version of the dependency that lacks the vulnerability;

generating a second version of the software program using the updated version of the dependency to mitigate the vulnerability; and deploying the second version of the software program and shutting down the first version of the software program.

16. The non-transitory computer-readable medium of claim 15, wherein the time window is a first time window, the dependency is a first dependency, the vulnerability is a first vulnerability, and the operations further comprise:

executing the second version of the software program during a second time window that is subsequent to the first time window;

determining that a second dependency was relied upon by the second version of the software program during the second time window;

based on determining that the second dependency was relied upon by the second version of the software program during the second time window, determining whether the second dependency has a second vulnerability;

in response to determining that the second dependency has a second vulnerability, automatically:

obtaining an updated version of the second dependency that lacks the second vulnerability;

generating a third version of the software program using the updated version of the second dependency to mitigate the second vulnerability; and deploying the third version of the software program and shutting down the second version of the software program.

17. The non-transitory computer-readable medium of claim 15, wherein the operation of determining that the dependency was relied upon by the first version of the software program during the time window involves:

generating a software bill of materials (SBOM) for the software program, wherein the SBOM identifies the dependency relied upon by the first version of the software program during the time window.

18. The non-transitory computer-readable medium of claim 17, wherein the SBOM lists a plurality of dependencies relied upon by the software program during the time window, the plurality of dependencies including the dependency with the vulnerability.

19. The non-transitory computer-readable medium of claim 15, wherein the operations comprise:

iteratively and sequentially mitigating vulnerabilities in the software program over a series of time windows by, for each respective time window in the series of time windows:

executing the software program;

determining a respective dependency relied upon by the software program during the respective time window, the respective dependency being different from other dependencies relied upon by the software program during previous time windows in the series of time windows;

determining that the respective dependency has a respective vulnerability;

obtaining an updated version of the respective dependency that lacks the respective vulnerability; and mitigating the respective vulnerability by rebuilding the software program using the updated version of the respective dependency.

20. The non-transitory computer-readable medium of claim 15, wherein the operations further comprise, during the time window and prior to deploying the second version of the software program:

determining that at least two dependencies of the software program have vulnerabilities;

in response to determining that the at least two dependencies of the software program have vulnerabilities, automatically:

obtaining updated versions of the at least two dependencies that lack the vulnerabilities; and generating the second version of the software program using the updated versions of the at least two dependencies to mitigate the vulnerabilities.

* * * * *